US010067660B2

(12) United States Patent
Kim

(10) Patent No.: US 10,067,660 B2
(45) Date of Patent: Sep. 4, 2018

(54) METHOD AND APPARATUS FOR DISPLAYING ATTRIBUTES OF PLANE ELEMENT

(71) Applicant: STUDIO XID KOREA, INC., Seoul (KR)

(72) Inventor: Soo Kim, Hwaseong-si (KR)

(73) Assignee: STUDIO XID KOREA, INC., Seoul (KR)

( * ) Notice: Subject to any disclaimer, the term of this patent is extended or adjusted under 35 U.S.C. 154(b) by 65 days.

(21) Appl. No.: 15/292,126

(22) Filed: Oct. 13, 2016

(65) Prior Publication Data

US 2017/0109021 A1   Apr. 20, 2017

(30) Foreign Application Priority Data

Oct. 16, 2015   (KR) .................. 10-2015-7030049

(51) Int. Cl.
*G06F 3/0484* (2013.01)
*G06T 15/10* (2011.01)

(52) U.S. Cl.
CPC .......... *G06F 3/04845* (2013.01); *G06T 15/10* (2013.01)

(58) Field of Classification Search
None
See application file for complete search history.

(56) References Cited

U.S. PATENT DOCUMENTS

| 2011/0164029 | A1 | 7/2011 | King et al. | |
| 2012/0139907 | A1* | 6/2012 | Lee | G06F 3/0304 345/419 |
| 2012/0229450 | A1 | 9/2012 | Kim et al. | |
| 2014/0201666 | A1* | 7/2014 | Bedikian | G06F 3/017 715/771 |
| 2016/0041630 | A1* | 2/2016 | Hosenpud | G06F 3/0346 345/157 |

FOREIGN PATENT DOCUMENTS

| KR | 10-2006-0008815 A | 1/2006 |
| KR | 10-2013-0077730 A | 7/2013 |
| WO | 2010/131902 A2 | 11/2010 |
| WO | 2013/009040 A2 | 1/2013 |

* cited by examiner

*Primary Examiner* — James A Thompson
(74) *Attorney, Agent, or Firm* — Studebaker & Brackett PC

(57) ABSTRACT

Disclosed are methods and apparatus for displaying attributes of a plurality of plane elements which form a plane layout, the methods includes at least: extracting a first elevation of a first plane element and a second elevation of a second plane element, from a reference plane of the plane layout, rotating the first and second plane elements in three dimensions, displaying the first and second plane elements to be separated from the reference plane, based on the extracted first and second elevations, according to the rotation of the first and second plane elements, displaying a first and second graphic objects, which represents one or more movement attributes of the first and second plane elements, on first and second virtual side surfaces which appear as a result of the rotation of the first and second plane element.

18 Claims, 15 Drawing Sheets

METHOD AND APPARATUS FOR DISPLAYING ATTRIBUTES OF PLANE ELEMENT

CROSS-REFERENCE TO RELATED APPLICATION

This application claims the benefit of Korean Patent Application No. 10-2015-7030049, filed on Oct. 16, 2015, in the Korean Intellectual Property Office, the disclosure of which is incorporated herein by reference in its entirety.

TECHNICAL FIELD

The present disclosure relates to a method and apparatus for displaying one or more plane elements on a screen through a user interface.

RELATED ART

The statements in this section merely provide information related to the present disclosure and do not necessarily constitute prior art.

After Material Design for providing a user interface using spaces and motions of plane elements was disclosed, numerous developers have been developing applications according to rules required in Material Design. According to Material Design, all plane elements displayed on the screen may have elevations. However, since all plane elements are displayed on a two-dimensional screen, their elevations are displayed simply as shadows.

Therefore, the inventor(s) has noted that it is difficult for developers to intuitively recognize the elevation of each plane element displayed on the screen in the process of developing an application. In addition, the inventor(s) has noted that the developers can identify attributes of each plane element displayed on the screen only by analyzing code in person. Therefore, the inventor(s) has noted that there is a need for a solution that enables developers to intuitively recognize the elevation and attributes of each plane element.

SUMMARY

Aspects of the present disclosure provide a method and apparatus for displaying plane elements, which form a plane layout, in three dimensions together with attributes of each of the plane elements during the simulation of an application.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to some embodiments of the present disclosure, a method of displaying attributes of a plurality of plane elements which form a plane layout is provided, the method includes at least: extracting a first elevation of a first plane element and a second elevation of a second plane element, from a reference plane of the plane layout, rotating the first plane element and the second plane element in three dimensions, displaying the first plane element to be separated from the reference plane, based on the extracted first elevation, according to the rotation of the first plane element, displaying the second plane element to be separated from the reference plane, based on the extracted second elevation, according to the rotation of the second plane element, displaying a first graphic object, which represents one or more movement attributes of the first plane element, on a first virtual side surface which appears as a result of the rotation of the first plane element, and displaying a second graphic object, which represents one or more movement attributes of the second plane element, on a second virtual side surface which appears as a result of the rotation of the second plane element.

According to some other embodiments of the present disclosure, a method of displaying attributes of a plurality of plane elements which form a plane layout is provided, the method includes at least: extracting a first elevation of a first plane element and a second elevation of a second plane element from a reference plane of the plane layout, rotating the first plane element and the second plane element in three dimensions, displaying the first plane element to be separated from the reference plane, based on the extracted first elevation, according to the rotation of the first plane element, displaying the second plane element to be separated from the reference plane, based on the extracted second elevation, according to the rotation of the second plane element, displaying a first graphic object, which represents one or more movement attributes of the first plane element, on a first outline which appears as a result of the rotation of the first plane element, and displaying a second graphic object, which represents one or more movement attributes of the second plane element, on a second outline which appears as a result of the rotation of the second plane element.

According to some other exemplary embodiments of the present disclosure, a computer program coupled to a computing device to execute a method of displaying attributes of plane elements which form a plane layout and stored in a non-transitory computer readable recording medium is provided, the program being configured to execute at least: an operation of extracting a first elevation of a first plane element and a second elevation of a second plane element, from a reference plane of the plane layout, an operation of rotating the first plane element and the second plane element in three dimensions, an operation of displaying the first plane element to be separated from the reference plane, based on the extracted first elevation, according to the rotation of the first plane element, an operation of displaying the second plane element to be separated from the reference plane, based on the extracted second elevation, according to the rotation of the second plane element, an operation of displaying a first graphic object, which represents one or more movement attributes of the first plane element, on a first virtual side surface which appears as a result of the rotation of the first plane element, and an operation of displaying a second graphic object, which represents one or more movement attributes of the second plane element, on a second virtual side surface which appears as a result of the rotation of the second plane element.

DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
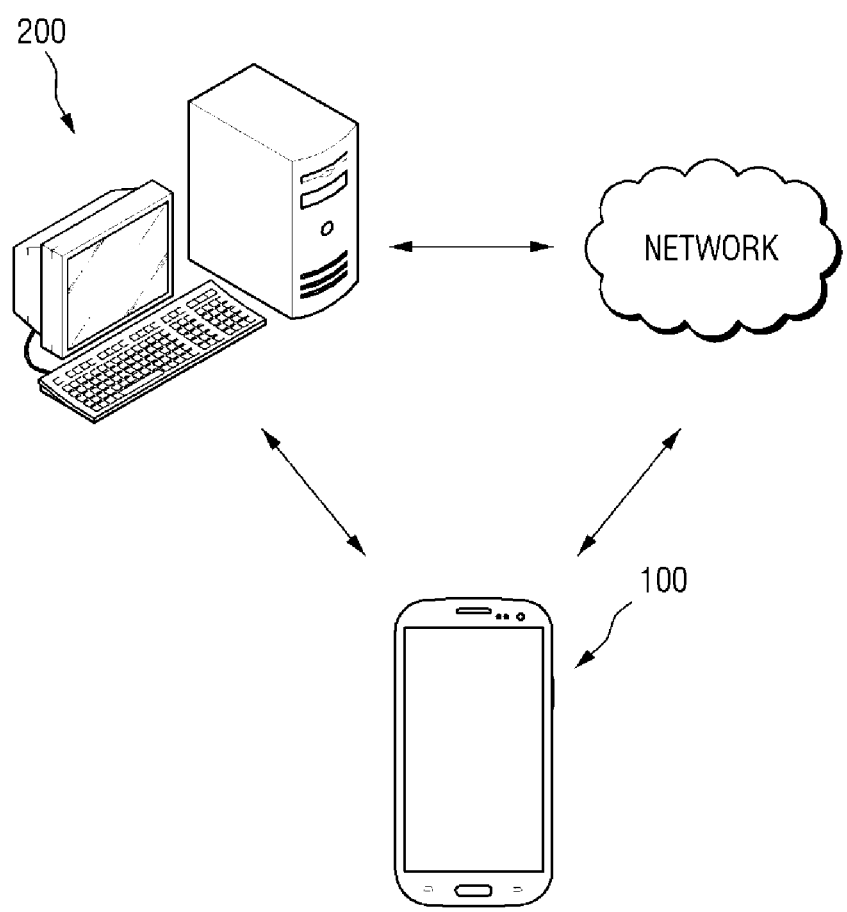
FIG. 1 illustrates the configuration of a simulation system according to some embodiments of the present disclosure.

Advantages and features of the present disclosure and methods of accomplishing the same is understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the present disclosure to those skilled in the art, and the present disclosure will only be defined by the appended claims. Like reference numerals refer to like components throughout the specification.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "made of," when used in this specification, specify the presence of stated components, steps, operations, and/or elements, but do not preclude the presence or addition of one or more other components, steps, operations, elements, and/or groups thereof.

Hereinafter, the present disclosure is described in greater detail with reference to the attached drawings.

FIG. 1 illustrates a configuration of a simulation system according to some embodiments. The simulation system illustrated in FIG. 1 is a system for developing and simulating an application, which is to be executed on user equipment 100, in computing device 200. Each component of the simulation system is a discrete functional component, and any one or more components is able to be implemented in combination in an actual physical environment.

Each component of the simulation system according to the embodiment is described in detail. The user equipment 100 is a device that executes an application simulated by the computing device 200.

More specifically, the user equipment 100 is directly connected to the computing device 200 to download an application from the computing device 200. In addition, the user equipment 100 downloads an application from an electronic (e)-marketplace through a network. Examples of the e-marketplace include, but are not limited to, Play Store of Google Inc. and App Store of Apple Inc.

The user equipment 100 executes a downloaded application. The user equipment 100 includes, but not limited to, any one of Android, iOS, and Windows as an operating system (OS) for executing an application.

The user equipment 100 is an device that downloads and execute an application. For example, the user equipment 100 is a mobile device such as a smartphone, a tablet, or phablet. However, the user equipment 100 is also a wearable device such as a smart watch, smart glasses, or a smart band. Further, the user equipment 100 is a laptop, a portable multimedia player (PMP), a personal digital assistant (PDA), or an e-book reader.

The computing device 200 is a device that simulates an application to be executed on the user equipment 100.

Specifically, the computing device 200 is an device that simulates an application. For example, the computing device 200 is a fixed computing device such as a desktop, a server, or a workstation. However, the computing device 200 is also the same type of device as the user equipment 100.

The computing device 200 provides an application programming interface (API), a library, resources, etc. needed to develop an application.

In particular, when simulating an application, the computing device 200 according to the embodiments displays, in three dimensions, one or more plane elements and attributes of each plane element on the screen. A more detailed description of the computing device 200 exhibiting the above features is given later with reference to FIGS. 2 through 15.

The network is infrastructure needed to exchange data between the user equipment 100 and the computing device 200. The network is, but is not limited to, any one of a mobile communication network such as Code Division Multiple Access (CDMA), Wideband CDMA (WCDMA), High Speed Packet Access (HSPA) or Long Term Evolution (LTE), a local area wireless communication network such as Wifi, Wibro or Wimax, and a wired communication network such as Ethernet, x Digital Subscriber Line (xDSL), Hybrid Fiber Coax (HFC) or Fiber To The Home (FTTH).

Figure 2:
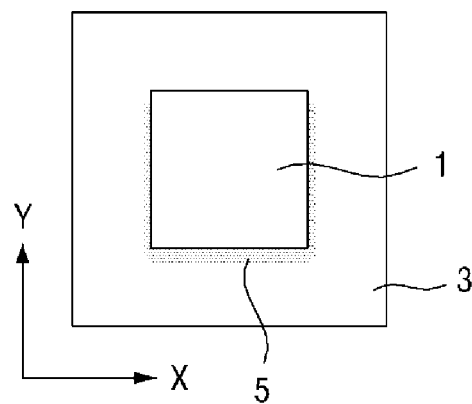
FIG. 2 illustrates a plane element and an elevation according to some embodiments of the present disclosure.
Figure 2:
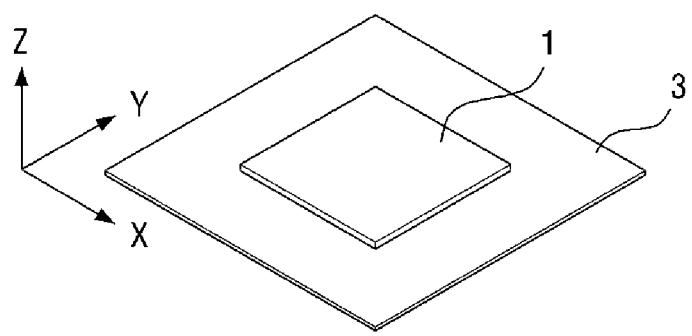
Figure 2:
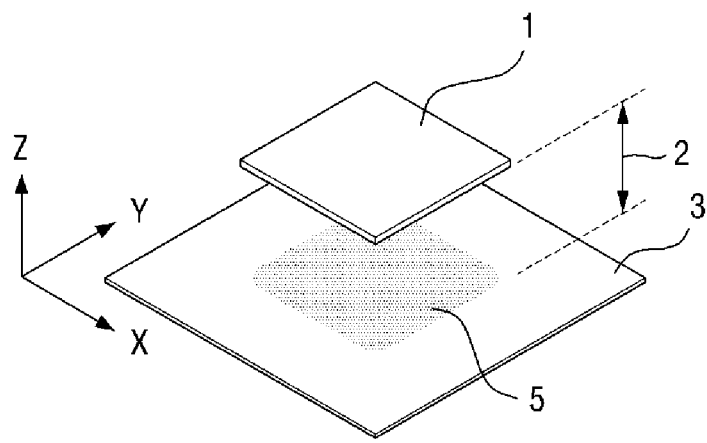

Plane elements and elevations is described below before a method of displaying attributes according to some embodiments. FIG. 2 illustrates a plane element and an elevation according to some embodiments.

Referring to FIG. 2, plane element 1 is an object that is displayed in two dimensions on screen 3. For example, the plane element 1 includes, but not limited to, an image, a button, a card, or another object. All plane elements that is displayed on the screen 3 have, but not limited to, a uniform thickness. In addition, all plane elements that is displayed on the screen 3 have elevations.

Elevation 2 is a virtual vertical height from a reference plane of the screen 3 to the plane element 1. That is, when the plane element 1 is an object that is displayed in two dimensions on an X-axis and a Y-axis of the screen 3, the elevation 3 is the location of the plane element 1 on a Z-axis. Therefore, an elevation determines the priority of plane elements that is finally displayed on the screen 3. For example, when two plane elements occupy the same two-dimensional coordinates, a plane element having a higher elevation is finally displayed on the screen 3. Two or more plane elements cannot have the same elevation, but the present disclosure is not limited thereto.

The elevation 2 of the plane element 1 is displayed as shadow 5 on the screen 3. For example, when the elevation 2 of the plane element 1 is high, the shadow 5 of the plane element 1 is displayed large on the screen 3. On the contrary, when the elevation 2 of the plane element 1 is low, the shadow 5 of the plane element 1 is displayed small on the screen 3.

As described above, elevation is a factor that determines the priority of a plurality of plane elements that is displayed on the screen 3. However, since the elevation 2 of the plane element 1 is displayed simply as the shadow 5 on the screen 3, it is difficult for an application developer to intuitively recognize the elevation 2 of the plane element 1 displayed on the screen 3.

Therefore, a method by which the application developer easily displays the elevation 2 and attributes of the plane element 1 is described follow. In particular, according to embodiments, the computing device 200 displays the attributes of the plane element 1 on the screen 3 as a graphic object. Accordingly, when simulating an application, the computing device 200 more intuitively provides information about the attributes of the plane element 1 to the application developer.

The graphic object include all visual elements that are displayed on at least one virtual side surface of the plane element 1 by the computing device 200 to show the attributes of the plane element 1. For example, the graphic object includes various visual elements such as the thickness, area and color of at least a region of the virtual side surface, the shape of the region of the virtual side surface, a figure inside the virtual side surface, edges of the virtual side surface, highlighting, internal hatching, etc. In addition, the graphic object includes dynamic visual elements such as the flickering of the virtual side surface for a preset period of time, the changing of the color of the virtual side surface, and the moving of the figure inside the virtual side surface.

According to some embodiments, the graphic object also includes all visual elements that are displayed on the outline of the plane element 1 by the computing device 200 in order to show the attributes of the plane element 1.

In some embodiments, the computing device 200 allocates different the graphic objects to various attributes of the plane element 1 according to a user's input. The computing device 200 also stores one graphic object allocated to one attribute.

Figure 3:
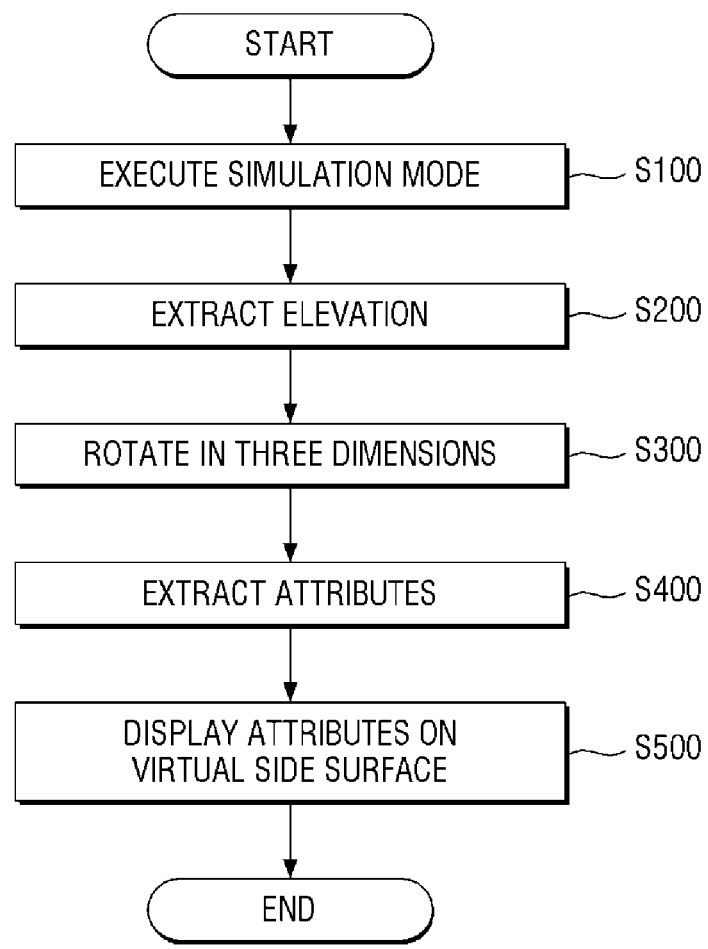
FIG. 3 is a flowchart illustrating a method of displaying attributes according to some embodiments of the present disclosure.

FIG. 3 is a flowchart illustrating a method of displaying attributes according to some embodiments. Referring to FIG. 3, the computing device 200 executes a simulation mode according to a user's input (operation S100). Here, the simulation mode is a mode for executing an application being developed or already developed in a virtual environment similar to the user equipment 100 before actually executing the application on the user equipment 100 and displaying the expected result of executing the application.

The computing device 200 extracts elevations of one or more plane elements which are to be displayed in a plane layout (operation S200). Here, the plane layout is a screen that is displayed by an application being developed or already developed. The plane layout includes one or more plane elements. The computing device 200 extracts the elevation of each plane element from an attribute field of an instance for realizing each plane element, but the present disclosure is not limited thereto.

The computing device 200 rotates, in three dimensions, the plane layout and the plane elements to be displayed in the plane layout (operation S300). Specifically, the computing device 200 rotates the plane layout and the plane elements about a three-dimensional axis. For example, when the plane layout and the plane elements are displayed in two dimensions on the X-axis and the Y-axis, the computing device 200 rotates the plane layout and the plane elements about the Z-axis. Then, the computing device 200 displays each plane element to be separated from the reference plane by the elevation of the plane element. Some embodiments of a three-dimensional view generated by the computing device 200 by rotating the plane layout and the plane elements is described later with reference to FIG. 4.

The computing device 200 extracts attributes of each plane element (operation S400). Here, the attributes of each plane element refer to characteristics of each plane element. Attributes of a plane element include, but not limited to, whether the plane element is movable and the moving speed, resistance, linkage, movable region, etc. of the plane element. The computing device 200 also extracts the attributes of each plane element from the attribute field of the instance for realizing each plane element, but the present disclosure is not limited thereto.

A detailed description of attributes that each plane element has is as follows.

Whether a plane element is movable is whether the location of the plane element in a plane layout is changed. For example, when the plane element is set immovable, the location of the plane element within the plane layout is not changed despite a drag input.

The moving speed of the plane element is acceleration at which the location of the plane element is changed within the plane layout. For example, when the moving speed of the plane element is set high, the location of the plane element within the plane layout is changed rapidly. On the contrary, when the moving speed of the plane element is set low, the location of the plane element within the plane layout is changed slowly.

The resistance of the plane element refers to a force acting in a direction opposite to a direction in which the location of the plane element is changed within the plane layout. For example, when the resistance of the plane element is set high, the location of the plane element is changed relatively little compared with the size of a drag input. On the contrary, when the resistance of the plane element is set low, the location of the plane element is changed relatively greatly compared with the size of the drag input.

The linkage of the plane element refers to whether the plane element is passively moved according to the movement of another plane element. For example, when a first plane element is connected to a second plane element, when the location of the second plane element is changed, the location of the first plane element is also changed.

The movable region of the plane element is a limit region in which the location of the plane element is changed within the plane layout. For example, when it is set that the plane element cannot be moved beyond the boundary of the plane layout, the plane element cannot be moved out of the plane layout although it is freely moved within the plane layout.

Finally, the computing device 200 displays the attributes of each plane element on a virtual side surface of the plane element which appears as a result of the three-dimensional rotation of the plane element (operation S500). Here, the virtual side surface of each plane element refers to a side surface of each plane element which is not visible when the plane element is displayed in two dimensions but becomes visible after the plane element is rotated in three dimensions. The computing device 200 displays the virtual side surface of each plane element with various graphic objects according to the attributes of the plane element. For example, the computing device 200 displays the virtual side surface of each plane element in a different shape or color according to an attribute of the plane element. In addition, the computing device 200 displays the attributes of each plane element on the outline of the plane element which appears as a result of the three-dimensional rotation of the plane element. In this case, the computing device 200 displays the outline of each plane element in a different color according to an attribute of the plane element.

More specifically, the computing device 200 displays a virtual side surface of a plane element to have a different thickness according to the moving speed of the plane element. In this case, the thickness of the virtual side surface is not an actual thickness but a virtual thickness of the plane element.

If there is resistance when the plane element moves, the computing device 200 displays the virtual side surface of the plane element to include protrusions whose sharpness is changed according to the magnitude of the resistance.

If the plane element is set immovable, the computing device 200 changes the color of a region of the virtual side surface of the plane element to a preset color and display the region in the preset color. Here, the preset color is, but is not limited to, an achromatic color or a metallic color.

When a first plane element is passively moved according to the movement of a second plane element, the computing device 200 displays a line connecting a virtual side surface of the first plane element and a virtual side surface of the second plane element.

If the plane element is set to not move beyond the boundary of the plane layout, the computing device 200 displays the virtual side surface of the plane element to include a threshold.

When the plane element cannot move beyond the boundary of the plane layout and reaches the boundary of the plane layout, the computing device 200 displays the virtual side surface of the plane element to include wrinkles.

If the plane element is set to not move beyond the boundary of the plane layout and to bounce back when hitting the boundary of the plane layout, the computing device 200 displays the virtual side surface of the plane element to include the shape of an elastic body.

When the plane element is moved by an external input, the computing device 200 changes the color of the whole or part of the virtual side surface of the plane element at preset intervals. For example, when the plane element is moved by an external drag input, the color of the virtual side surface of the plane element is alternately changed to red and white at intervals of 0.5 seconds.

If the plane element is scrolled, the computing device 200 displays the virtual side surface of the plane element to include a scrollable direction.

Some embodiments of plane elements whose attributes are displayed as described above is described later with reference to FIGS. 5 through 13.

In summary, the computing device 200 according to the embodiment provides a three-dimensional view generated by rotating one or more plane elements in three dimensions. Therefore, an application developer intuitively recognizes the elevation of each plane element. In addition, the computing device 200 displays attributes of each plane element in the three-dimensional view. Therefore, the application developer also recognizes the attributes of each plane element.

Figure 4:
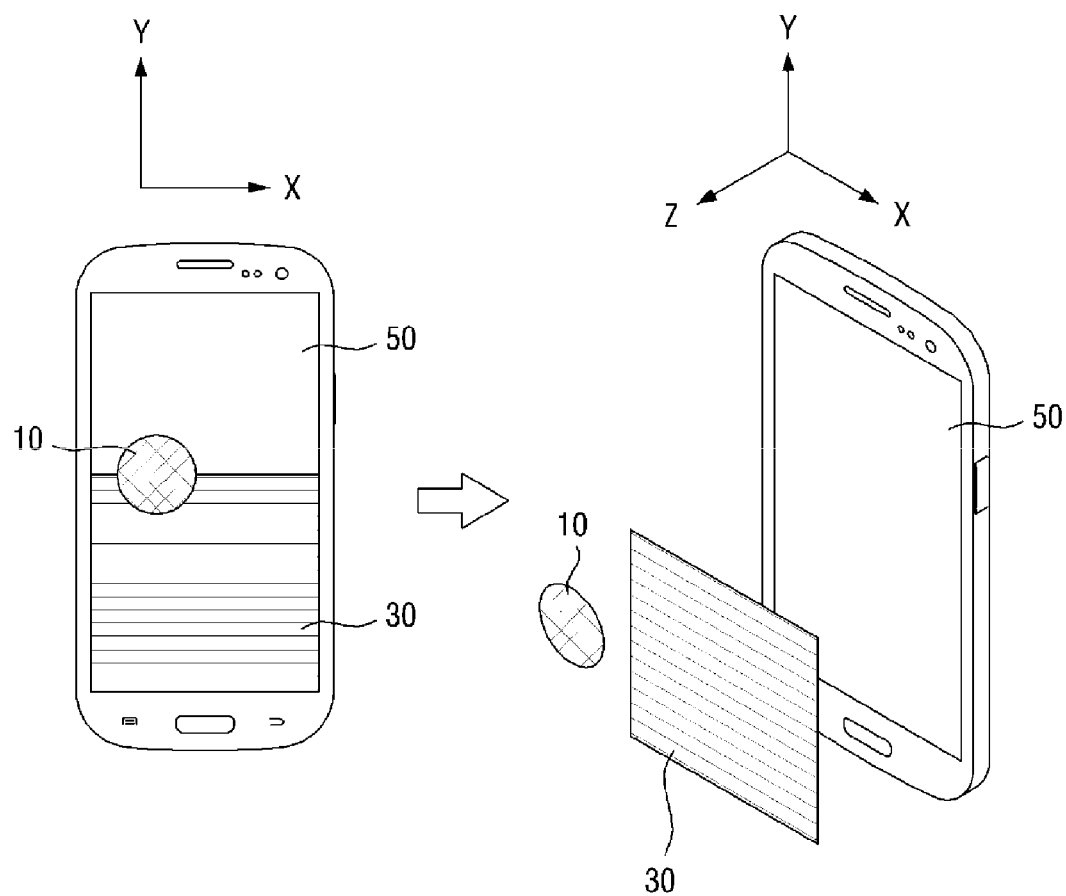
FIG. 4 illustrates a three-dimensional view according to some embodiments of the present disclosure.

Some embodiments of a three-dimensional view generated by the computing device 200 by rotating a plane layout and plane elements is described follow. FIG. 4 illustrates a three-dimensional view according to some embodiments.

Referring to FIG. 4, when a three-dimensional view according to some embodiments is applied, first plane element 10, second plane element 30, and plane layout 50 are displayed in a two-dimensional coordinate system of the X-axis and the Y-axis. In addition, elevations of the first plane element 10 and the second plane element 30 are simply displayed as shadows. Therefore, even when the elevation of the first plane element 10 is greater than that of the second plane element 30, it is difficult for an application developer to recognize which of the elevation of the first plane element 10 and the elevation of the second plane element 30 is greater.

However, when the three-dimensional view according to the embodiment is applied, the first plane element 10, the second plane element 30, and the plane layout 50 are rotated about the Z-axis and displayed accordingly. In addition, the first plane element 10 and the second plane element 30 are displayed to be separated from a reference plane of the plane layout 50 by the elevations of the first plane element 10 and the second plane element 30, respectively. Therefore, the application developer intuitively recognizes that the elevation of the first plane element 10 is greater than that of the second plane element 30.

Some embodiments of plane elements whose attributes are displayed is described. FIGS. 5 through 13 illustrate plane elements whose attributes are displayed according to embodiments. In FIGS. 5 through 13, it is assumed that attributes of first plane element 10 or second plane element 30 to be displayed in plane layout 50 are displayed on a virtual side surface 20 or 40 of the first plane element 10 or the second plane element 30. In particular, movement attributes of a plane element which are referred to in some embodiments are described using examples with reference to FIGS. 5 through 13. Here, the movement attributes are attributes indicating various information such as, when a plane element is moved, the moving range, speed or direction and dependency/independency of the plane element and information about an input that moves the plane element.

Figure 5:
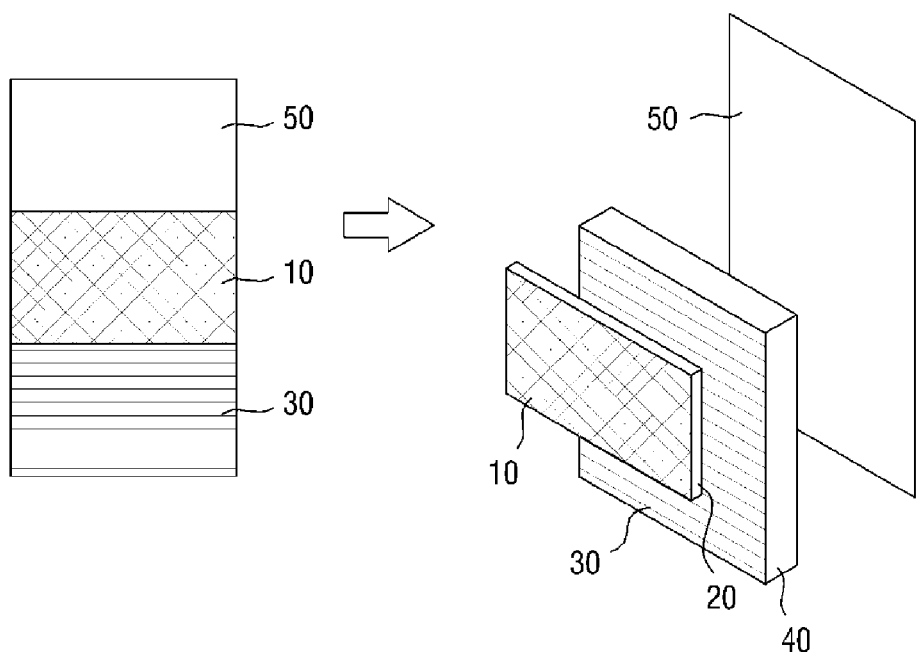
FIGS. 5 through 13 illustrate plane elements whose attributes are displayed according to some embodiments of the present disclosure.

In FIG. 5, it is assumed that the moving speed of the first plane element 10 is set low and that the moving speed of the second plane element 30 is set high. Referring to FIG. 5, the computing device 200 displays the virtual side surface 20 of the first plane element 10 relatively thin and the virtual side surface 40 of the second plane element 30 relatively thick according to the respective moving speeds of the first plane element 10 and the second plane element 30.

Figure 6:
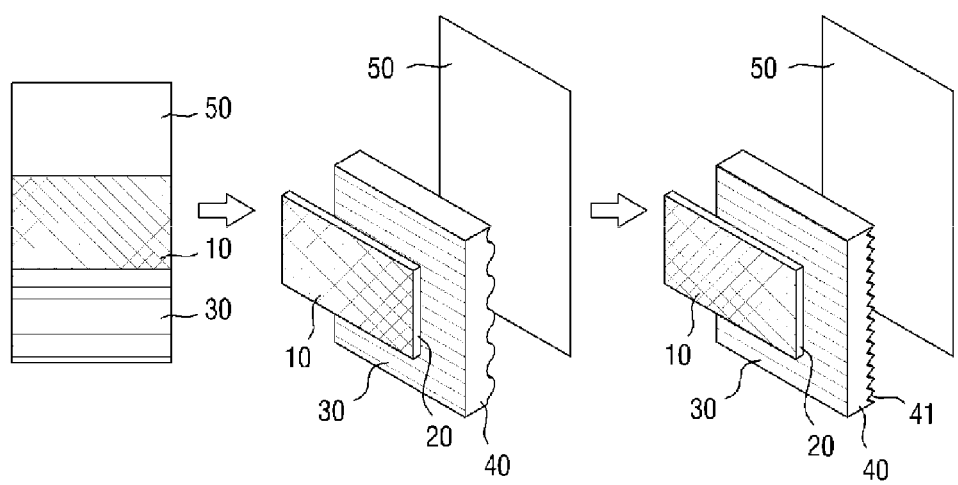

In FIG. 6, it is assumed that resistance is set to act when the first plane element 10 moves and to not act when the second plane element 30 moves. Referring to FIG. 6, according to the presence or absence of the resistance, the computing device 200 displays the virtual side surface 20 of the first plane element 10 without protrusions and display the virtual side surface 40 of the second plane element 30 with protrusions 41 whose sharpness is increased as the magnitude of the resistance increases.

Figure 7:
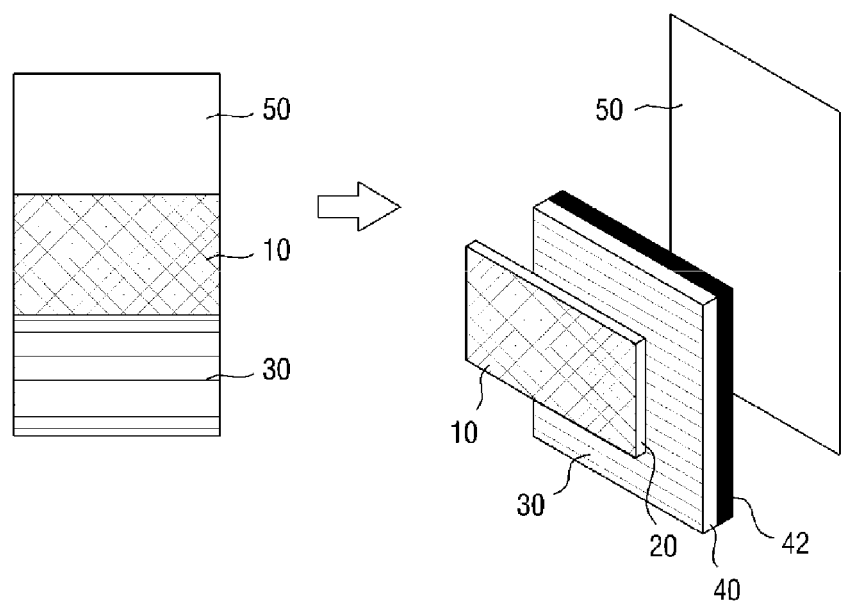

In FIG. 7, it is assumed that the first plane element 10 is set movable and that the second plane element 30 is set immovable. Referring to FIG. 7, the computing device 200 changes the color of region 42 of the virtual side surface 40 of the second plane element 30 to an achromatic color and display the region 42 in the achromatic color.

Figure 8:
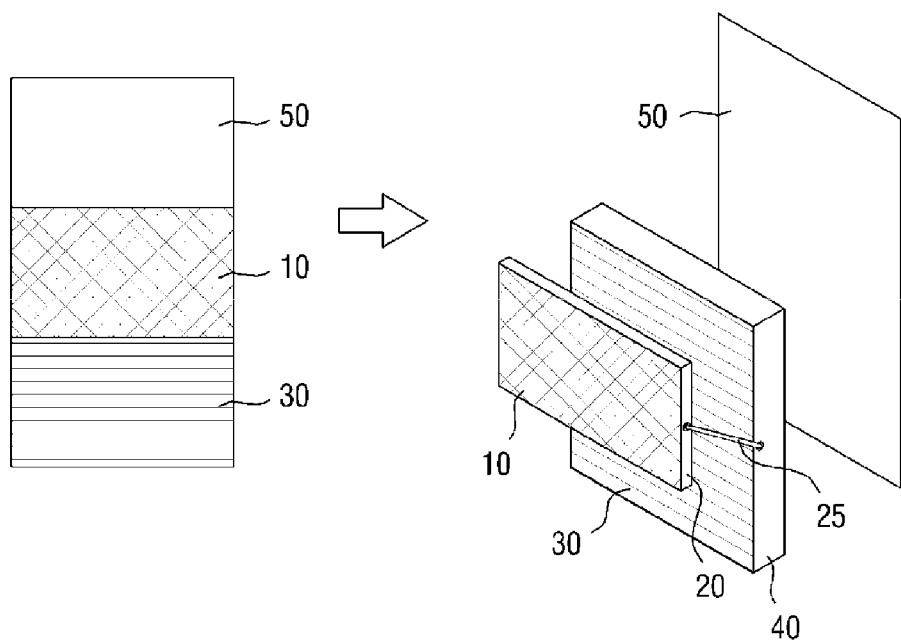

In FIG. 8, it is assumed that the first plane element 10 is set to be passively moved according to the movement of the second plane element 30. Referring to FIG. 8, the computing device 200 displays line 25 connecting the virtual side surface 20 of the first plane element 10 and the virtual side surface 40 of the second plane element 30.

Referring to FIG. 8, the attributes of the first plane element 10 includes attributes determined based on the attributes of the second plane element 30. For example, the attributes of the first plane element 10 includes an attribute indicating whether the first plane element 10 moves independently of or dependently on the second plane element 30. In addition, the attributes of the first plane element 10 includes an attribute indicating whether the first plane element 10 moves only within the area of the second plane element 30 or whether the first plane element 10 moves in response to the movement of the second plane element 30.

The attributes of the second plane element 30 also includes attributes determined based on the attributes of the first plane element 10 and/or the plane layout 50.

The correlation between the first plane element 10, the second plane element 30 and the plane layout 50 are described in greater detail with reference to FIGS. 9 through 11.

Figure 9:
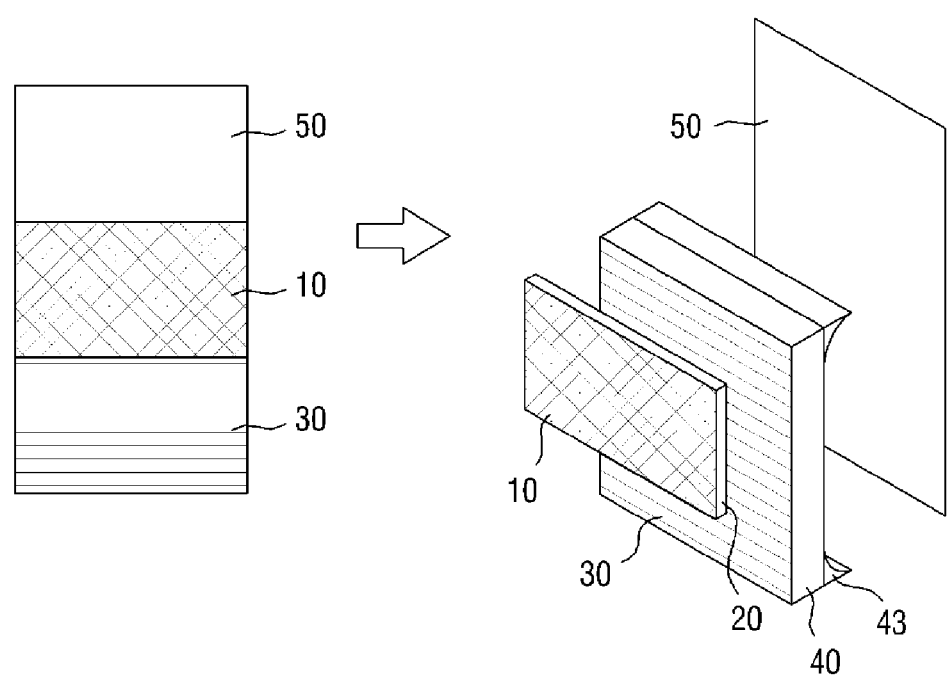

In FIG. 9, it is assumed that the first plane element 10 is set to move beyond the boundary of the plane layout 50 but that the second plane element 30 is set to not move beyond the boundary of the plane layout 50. Referring to FIG. 9, the computing device 200 displays the virtual side surface 20 of the first plane element 10 without any threshold. On the other hand, the computing device 200 displays the virtual side surface 40 of the second plane element 30 with triangular threshold 43.

Figure 10:
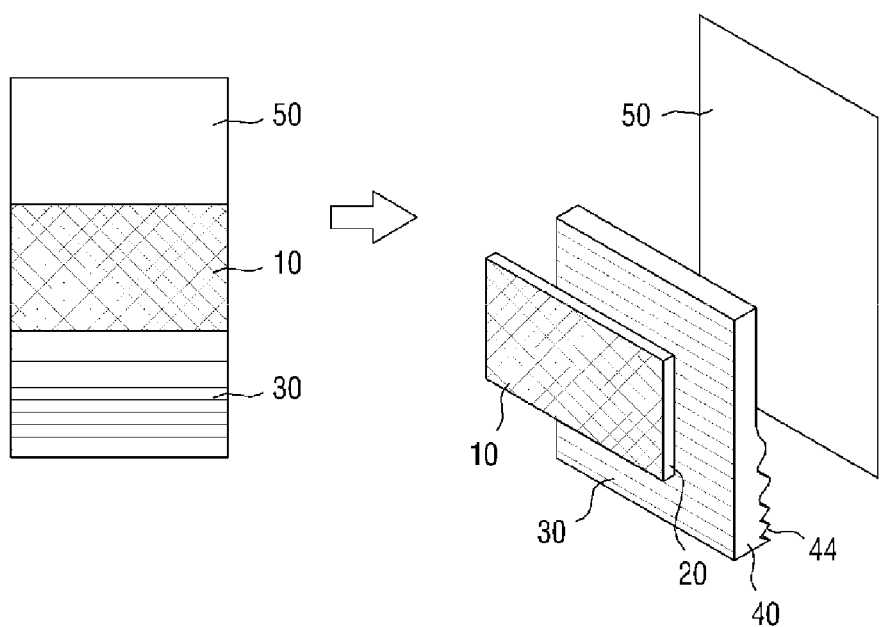

In FIG. 10, it is assumed that the second plane element 30 cannot move beyond the boundary of the plane layout 50 but reaches the boundary of the plane layout 50. Referring to FIG. 10, the computing device 200 displays the virtual side surface 40 of the second plane element 30 to include wrinkles 44. In addition, when an external input is continuously input to move the second plane element 30 beyond the boundary of the plane layout 50, the computing device 200 increases the size of the wrinkles 44 included in the virtual side surface 40 of the second plane element 30.

Figure 11:
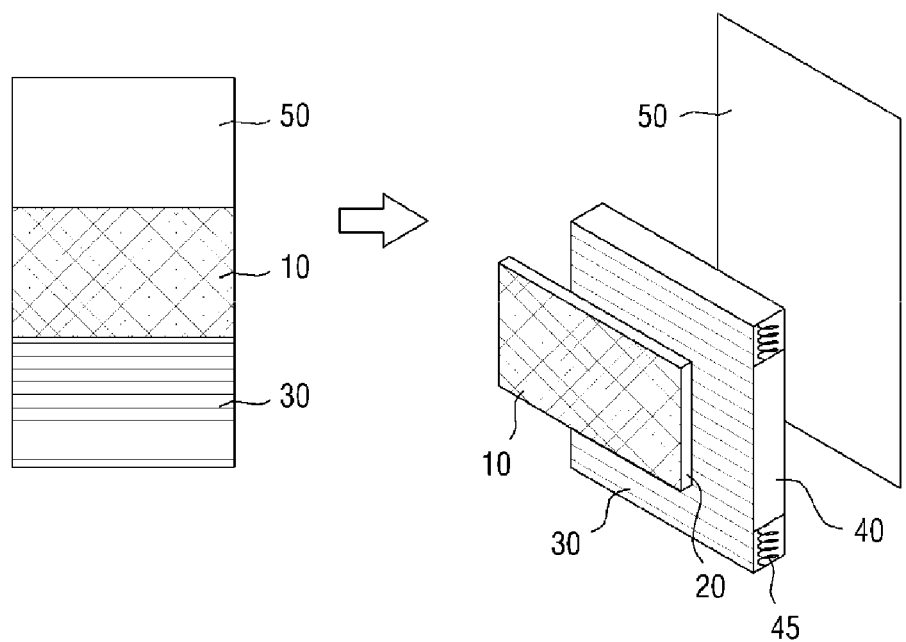

In FIG. 11, it is assumed that the second plane element 30 is set to not move beyond the boundary of the plane layout 50 and to bounce back when hitting the boundary of the plane layout 50. Referring to FIG. 11, the computing device 200 displays the virtual side surface 40 of the second plane element 30 to include spring shape 45.

Although not illustrated in the drawings, any one of the first plane element 10 and the second plane element 30 is set to move in response to the movement of the other plane element 10 or 30. For example, the first plane element 10 is moved in a chained manner according to the movement of the second plane element 30. In this case, when the second plane element 30 is moved by more than a preset range, the first plane element 10 is moved by the preset range in response to the movement of the second plane element 30.

In such a case, the computing device 200 displays a chain-shaped graphic effect representing the chained movement characteristic on the virtual side surface of any one plane element.

Figure 12:
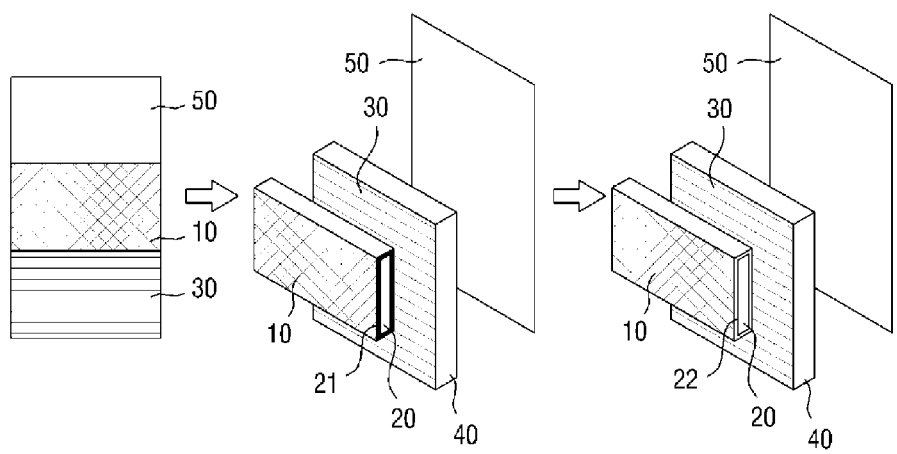

In FIG. 12, it is assumed that the first plane element 10 is being moved by an external input. Referring to FIG. 12, the computing device 200 displays edges of the virtual side surface 20 of the first plane element 10 alternately in first color 21 and second color 22.

Figure 13:
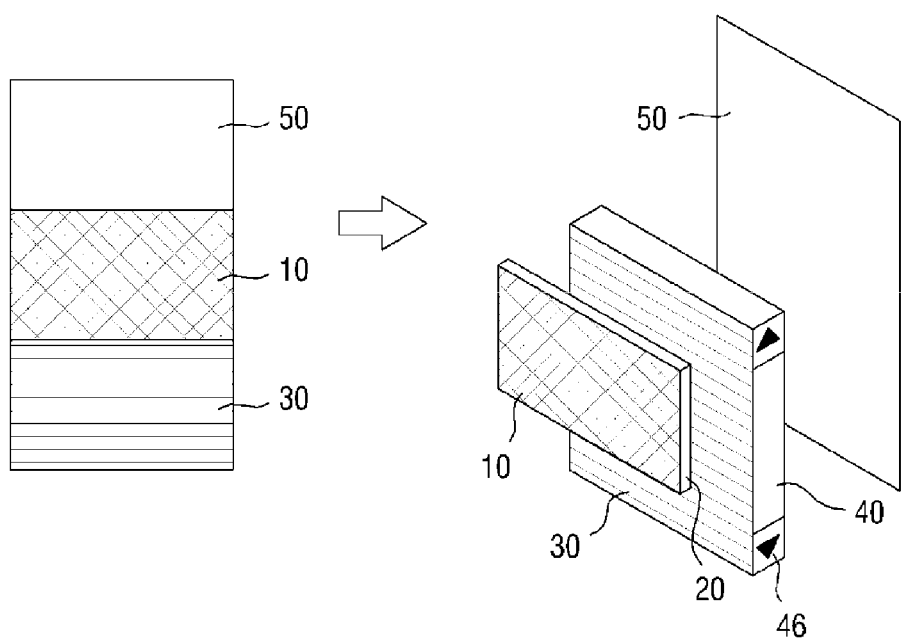

In FIG. 13, it is assumed that the second plane element 30 is set scrollable in the direction of the Y-axis. Referring to FIG. 13, the computing device 200 displays the virtual side surface 40 of the second plane element 30 to include scrollable direction 46 of the second plane element 30.

The methods according to the embodiments described above with reference to FIGS. 3 through 13 is performed by the execution of a computer program implemented as computer-readable code. The computer program is transmitted from a first computing device to a second computing device through a network such as the Internet and then installed in the second computing device for use. Each of the first computing device and the second computing device is a fixed computing device such as a desktop, a server or a workstation, a mobile computing device such as a smartphone, a tablet, a phablet or a laptop, or a wearable computing device such as a smart watch, smart glasses or a smart band.

The logical configuration of computing device 200 according to some embodiments is described in detail with reference to FIGS. 14 and 15 as follow.

Figure 14:
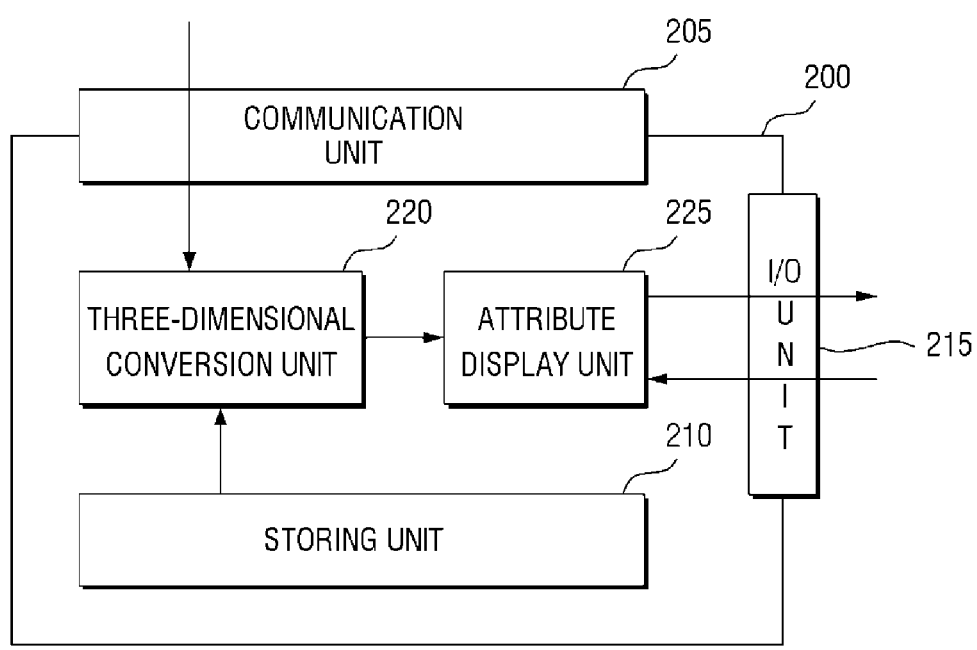
FIG. 14 is a schematic block diagram of a computing device according to some embodiments of the present disclosure.

FIG. 14 is a schematic block diagram of computing device 200 according to some embodiments. Referring to FIG. 14, the computing device 200 includes communication unit 205, storing unit 210, input/output (I/O) unit 215, three-dimensional conversion unit 220, and attribute display unit 225.

The communication unit 205 transmits or receives data to or from user equipment 100 through a network or a cable connected directly to the communication unit 205. Specifically, the communication unit 205 transmits or receive an application and an API or a library needed for the execution of the application to or from the user equipment 100.

The storing unit 210 stores data needed for the operation of the computing device 200. Specifically, the storing unit 210 stores an API, a library or resources needed to develop or simulate an application.

The I/O unit 215 receives data needed for the operation of the computing device 200 and outputs data related to the operation of the computing device 200. Specifically, the I/O unit 215 receives data through a keyboard, a mouse, a joystick, a track ball or a touch pad. The I/O unit 215 outputs data through a Liquid Crystal Display (LCD), a Light-Emitting Diode (LED), an Organic LED (OLED), an Active Matrix OLED (AMOLED), or a speaker. In addition, the I/O unit 215 simultaneously inputs and outputs data through a touch screen, but the present disclosure is not limited thereto.

The three-dimensional conversion unit 220 generates a three-dimensional view of one or more elements and a virtual screen. Specifically, the three-dimensional conversion unit 220 extracts elevations of one or more plane elements to be displayed in a plane layout. Then, the three-dimensional conversion unit 220 rotates the plane layout and the plane elements in three dimensions. The three-dimensional conversion unit 220 displays each plane element to be separated from a reference plane of the plane layout by the elevation of the plane element.

The attribute display unit 225 displays the three-dimensional view including attributes of each plane element. Specifically, the attribute display unit 225 extracts the attributes of each plane element included in the three-dimensional view. Then, the attribute display unit 225 displays the attributes of each plane element on a virtual side surface of the plane element which appears as a result of the three-dimensional rotation of the plane element.

Each component described above with reference to FIG. 14 is implemented as a software component or a hardware component such as a Field Programmable Gate Array (FPGA) or Application Specific Integrated Circuit (ASIC). However, the components are not limited to the software or hardware components. A component is advantageously configured to reside on the addressable storage medium and configured to execute on one or more processors. The functionality provided for in the components is combined into fewer components or further separated into additional components.

Figure 15:
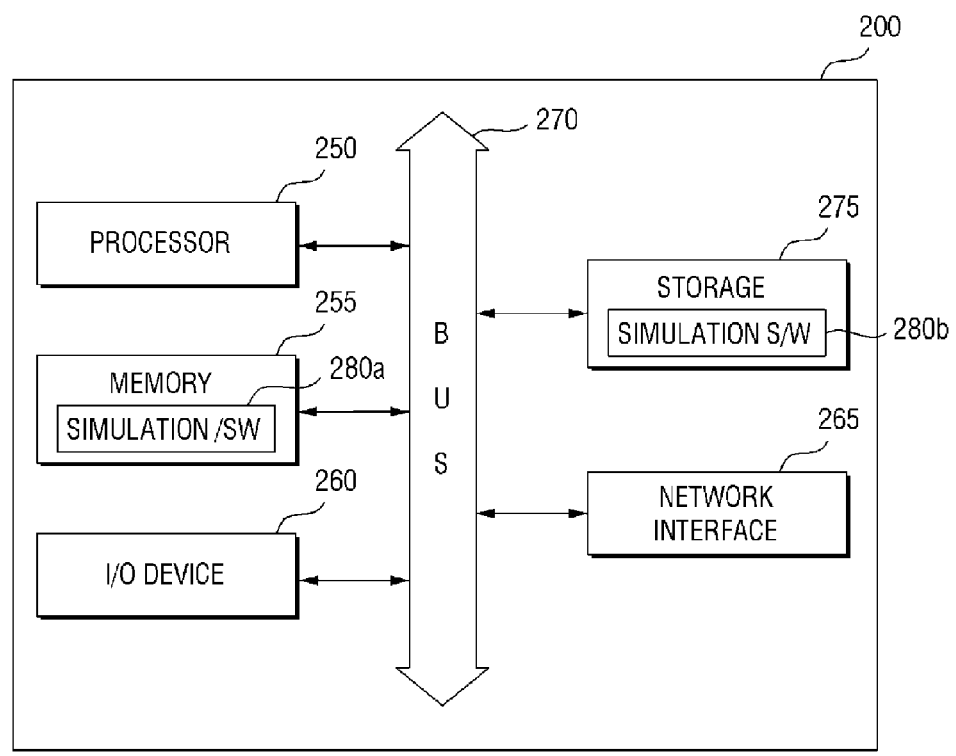
FIG. 15 illustrates a schematic block diagram of a hardware configuration of the computing device shown in FIG. 14.

FIG. 15 illustrates the hardware configuration of the computing device 200 of FIG. 14. Referring to FIG. 15, the computing device 200 includes processor 250, memory 255, I/O device 260, network interface 265, data bus 270, and storage device 275.

The memory 255 stores computer program data 280a which implements a method of displaying attributes. The I/O device 260 is used by a user to input or output data needed for the operation of the computing device 200. The network interface 265 transmits or receive data using a network. The data bus 270 is connected to the processor 250, the memory 255, the I/O device 260, the network interface 265 and the storage device 275 to serve as a path through which data is transmitted between the processor 250, the memory 255, the I/O device 260, the network interface 265 and the storage device 275.

The storage device 275 non-temporarily stores an API, a library file, a resource file, etc. needed to execute a computer program. In addition, the storage device 275 stores computer program data 280b which implements the method of displaying attributes.

More specifically, the storage device 275 stores a computer program including an instruction for rotating a plane element in three dimensions and an instruction for displaying attributes of the plane element on a virtual side surface of the plane element which appears as a result of the three-dimensional rotation of the plane element.

According to the present disclosure, a three-dimensional view generated by rotating each plane element in three dimensions is provided. Therefore, an application developer intuitively recognizes the elevation of each plane element.

In addition, since attributes of each plane element are displayed in the three-dimensional view together with the plane elements, the application developer have the user experience of easily recognizing the attributes of each plane element.

In some embodiments, the above-discussed method of FIG. 3, according to this disclosure, are implemented in the form of program being readable through a variety of computer means and be recorded in any non-transitory computer-readable medium. Here, this medium, in some embodiments, contains, alone or in combination, program instructions, data files, data structures, and the like. These program instructions recorded in the medium are, in some embodiments, specially designed and constructed for the present disclosure or known to persons in the field of computer software. For example, the medium includes hardware devices specially configured to store and execute program instructions, including magnetic media such as a hard disk, a floppy disk and a magnetic tape, optical media such as CD-ROM (Compact Disk Read Only Memory) and DVD (Digital Video Disk), magneto-optical media such as floptical disk, ROM, RAM (Random Access Memory), and flash memory. Program instructions include, in some embodiments, machine language codes made by a complier and high-level language codes executable in a computer using an interpreter or the like. These hardware devices are, in some embodiments, configured to operating as one or more of software to perform the operation of this disclosure, and vice versa.

A computer program (also known as a program, software, software application, script, or code) for implementing the message processing method according to this disclosure is, in some embodiments, written in a programming language, including compiled or interpreted languages, or declarative or procedural languages. A computer program includes, in some embodiments, a unit suitable for use in a computing environment, including as a stand-alone program, a module, a component, or a subroutine. A computer program is or is not, in some embodiments, correspond to a file in a file system. A program is, in some embodiments, stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program is, in some embodiments, deployed to be executed on one or more computer processors located locally at one site or distributed across multiple remote sites and interconnected by a communication network.

Each block of the block diagram and each step of the flowchart attached to present disclosure may indicate a part of a module, a segment, or a code including one or more executable instructions for performing specified logical function(s). Further, it should be noted that the functions mentioned in the blocks or steps is out of order in alternative embodiments. For example, two successive blocks or steps is simultaneously performed substantially or is performed in a reverse order according to the corresponding functions sometimes. Although the embodiments of the present disclosure have been described for illustrative purposes, those skilled in the art will appreciate that various modifications, additions and substitutions are possible, without departing from the scope and spirit of the disclosure.

What is claimed is:

1. A method of displaying attributes of a plurality of plane elements which form a plane layout, the method comprising:
    extracting a first elevation of a first plane element and a second elevation of a second plane element, from a reference plane of the plane layout;
    rotating the first plane element and the second plane element in three dimensions;
    displaying the first plane element to be separated from the reference plane, based on the extracted first elevation, according to the rotation of the first plane element;
    displaying the second plane element to be separated from the reference plane, based on the extracted second elevation, according to the rotation of the second plane element;
    displaying a first graphic object, which represents one or more movement attributes of the first plane element, on a first virtual side surface of the first plane element, wherein the first virtual side surface does not appear before the rotation of the first plane element and does appear as a result of the rotation of the first plane element; and
    displaying a second graphic object, which represents one or more movement attributes of the second plane element, on a second virtual side surface of the second plane element, wherein the second virtual side surface does not appear before the rotation of the second plane element and does appear as a result of the rotation of the second plane element.

2. The method of claim 1, wherein the extracting of the elevation comprises, prior to the rotating, displaying the first plane element to be overlaid on the second plane element based on two-dimensional coordinates of a first area occupied by the first plane element and a second area occupied by the second plane element, and based on the first elevation and the second elevation.

3. The method of claim 1, wherein the first graphic object and the second graphic object are displayed in at least one of different shapes and different colors according to the one or more movement attributes of the first plane element and the one or more movement attributes of the second plane element.

4. The method of claim 1, wherein the first graphic object and the second graphic object are displayed to have different thicknesses according to a first moving speed of the first plane element and a second moving speed of the second plane element, respectively.

5. The method of claim 1, wherein, when there is resistance to a movement of at least one of the first plane element and the second plane element, at least one corresponding graphic object among the first graphic object and the second graphic object is displayed to include protrusions whose sharpness is changed according to a magnitude of the resistance.

6. The method of claim 1, wherein, when at least one of the first plane element and the second plane element is immovable, a corresponding graphic object among the first graphic object and the second graphic object is displayed as a region having a preset color, on the virtual side surface, the preset color is different from an original color of the virtual side surface.

7. The method of claim 1, wherein, when the first plane element is passively moved according to a movement of the second plane element, the first graphic object and the second graphic object are displayed as a line which connects the first virtual side surface and the second virtual side surface.

8. The method of claim 1, wherein, when at least one of the first plane element and the second plane element cannot move beyond a boundary of the plane layout, at least one corresponding graphic object among the first graphic object and the second graphic object is displayed to include a shape of a threshold, on the virtual side surface of the at least one of the first plane element and the second plane element.

9. The method of claim 1, wherein, when at least one of the first plane element and the second plane element cannot move beyond a boundary of the plane layout and bounces back when hitting the boundary, at least one corresponding graphic object among the first graphic object and the second graphic object is displayed to include a shape of an elastic body, on the virtual side surface of the at least one of the first plane element and the second plane element.

10. The method of claim 1, wherein, when at least one of the first plane element and the second plane element is scrollable, at least one corresponding graphic object among the first graphic object and the second graphic object is displayed to include a scrollable direction, on the virtual side surface of the at least one of the first plane element and the second plane element.

11. The method of claim 1, wherein, when at least one of a location and size of one of the first plane element and the second plane element satisfies a predetermined requirement according to an external input or a simulation scenario, a corresponding graphic object among the first graphic object and the second graphic object is displayed in at least one of different shapes and different colors from the other graphic object, on the virtual side surface of the one of the first plane element and the second plane element.

12. The method of claim 1, wherein, when at least one of a location and size of one of the first plane element and the second plane element satisfies a predetermined requirement according to an external input or a simulation scenario, the reference plane of the plane layout is displayed in at least one of a different shape and a different color from that of original reference plane.

13. The method of claim 1, wherein, when one of the first plane element and the second plane element is selected by an external input, a whole or part of a corresponding graphic object among the first graphic object and the second graphic object is displayed in at least one of a different shape and a different color from the other graphic object, on the virtual side surface of the one of the first plane element and the second plane element.

14. The method of claim 1, wherein the one or more movement attributes of the first plane element are determined based on the one or more movement attributes of the second plane element.

15. The method of claim 1, wherein, when one of the first plane element and the second plane element is moved in response to the movement of the other plane element, a corresponding graphic object among the first graphic object and the second graphic object is displayed to include a shape of a chain, on the virtual side surface of the one of the first plane element and the second plane element.

16. A method of displaying attributes of a plurality of plane elements which form a plane layout, the method comprising:
    extracting a first elevation of a first plane element and a second elevation of a second plane element from a reference plane of the plane layout;
    rotating the first plane element and the second plane element in three dimensions;
    displaying the first plane element to be separated from the reference plane, based on the extracted first elevation, according to the rotation of the first plane element;
    displaying the second plane element to be separated from the reference plane, based on the extracted second elevation, according to the rotation of the second plane element;
    displaying a first graphic object, which represents one or more movement attributes of the first plane element, on a first outline of the first plane element, wherein the first outline does not appear before the rotation of the first plane element and does appear as a result of the rotation of the first plane element; and
    displaying a second graphic object, which represents one or more movement attributes of the second plane element, on a second outline of the second plane element, wherein the second outline does not appear before the rotation of the second plane element and does appear as a result of the rotation of the second plane element.

17. The method of claim 16, wherein at least one of the first graphic object and the second graphic object is displayed to include an outline having a different color from an original color of the at least one of the first graphic object and the second graphic object, according to a movement attribute of corresponding plane element.

18. A non-transitory computer readable recording medium storing a computer program coupled to a computer device to execute a method of displaying attributes of plane elements which form a plane layout, the program being configured to execute:
    an operation of extracting a first elevation of a first plane element and a second elevation of a second plane element, from a reference plane of the plane layout;
    an operation of rotating the first plane element and the second plane element in three dimensions;
    an operation of displaying the first plane element to be separated from the reference plane, based on the extracted first elevation, according to the rotation of the first plane element;
    an operation of displaying the second plane element to be separated from the reference plane, based on the extracted second elevation, according to the rotation of the second plane element;

an operation of displaying a first graphic object, which represents one or more movement attributes of the first plane element, on a first virtual side surface of the first plane element, wherein the first virtual side surface does not appear before the rotation of the first plane element and does appear as a result of the rotation of the first plane element; and an operation of displaying a second graphic object, which represents one or more movement attributes of the second plane element, on a second virtual side surface of the second plane element, wherein the second virtual side surface does not appear before the rotation of the second plane element and does appear as a result of the rotation of the second plane element.

* * * * *